United States Patent [19]

Martin

[11] 4,273,896

[45] Jun. 16, 1981

[54] SILYLATED POLYMERS AND SILYLATED ORGANIC-ORGANOPOLYSILOXANE BLOCK COPOLYMERS

[75] Inventor: Eugene R. Martin, Onsted, Mich.

[73] Assignee: SWS Silicones Corporation, Adrian, Mich.

[21] Appl. No.: 134,004

[22] Filed: Mar. 26, 1980

Related U.S. Application Data

[60] Continuation-in-part of Ser. No. 924,111, Jul. 12, 1978, abandoned, which is a division of Ser. No. 813,157, Jul. 5, 1977, Pat. No. 4,148,838.

[51] Int. Cl.$^3$ .................... C08F 6/02; C08F 297/02
[52] U.S. Cl. ................................. 525/271; 525/106; 525/288
[58] Field of Search ................... 525/271, 288, 106

[56] References Cited

U.S. PATENT DOCUMENTS

| | | | |
|---|---|---|---|
| 3,051,684 | 8/1962 | Morton et al. | 525/105 |
| 3,468,972 | 9/1969 | Hsieh | 525/250 |
| 3,483,270 | 12/1969 | Bostick | 525/105 |
| 3,637,899 | 1/1972 | Nametkin et al. | 525/288 |
| 3,840,616 | 10/1974 | Clark et al. | 525/105 |
| 3,870,766 | 3/1975 | Chadha | 260/18 S |
| 3,956,419 | 5/1976 | Murray | 525/51 |
| 4,117,063 | 9/1978 | Voigt et al. | 264/102 |

*Primary Examiner*—Wilbert J. Briggs, Sr.

[57] ABSTRACT

Carbanion containing organic polymers are reacted with silicon containing compounds having aliphatic unsaturation to form a new class of carbanion containing silylated organic polymers. These carbanion containing silylated organic polymers can then be reacted with cyclic siloxanes to form silanoate containing silylated organic-organopolysiloxane block copolymers which may then be reacted with a compound which will react with the carbanion or silanoate to form silylated copolymers and silylated organic-organopolysiloxane block copolymers.

10 Claims, No Drawings

SILYLATED POLYMERS AND SILYLATED ORGANIC-ORGANOPOLYSILOXANE BLOCK COPOLYMERS

This application is a continuation-in-part of copending application Ser. No. 924,111, filed July 12, 1978 now abandoned, which was a divisional application of application Ser. No. 813,157, filed July 5, 1977 and now U.S. Pat. No. 4,148,838.

The present invention relates to organic polymers containing silicon atoms, particularly to silylated organic polymers and more particularly to silylated organic-organopolysiloxane block copolymers.

BACKGROUND OF THE INVENTION

Heretofore, copolymers have been prepared by reacting alkali metal terminate organic polymers free of silicon atoms with cyclic siloxanes. (See U.S. Pat. Nos. 3,483,270 and 3,051,684 to Bostick and Morton et al, respectively.) However, neither of these references disclose the formation of silylated polymers by reacting alkali metal terminated organic polymers with silicon compounds having aliphatic unsaturation to form organic polymers containing silicon atoms. Moreover, these references do not disclose silylated organic-organopolysiloxane block copolymers or a method for preparing the same.

Also, U.S. Pat. No. 3,956,419 to Murray discloses a slurry polymerization of styrene and divinylbenzene in the presence of an anionic initiator and thereafter terminating the slurry polymerization with a suitable terminating agent which imparts groups that are reactive with a silicone rubber when its cure is effected.

Murray discloses forming a carbanion containing organic polymer by polymerizing a monomer having carbon-to-carbon double bonds in the presence of a carbanion forming catalyst and then reacting the organic polymer with a terminating agent. It does not disclose reacting an alkali metal terminated silylated organic polymer or silylated organic silicone copolymers with a terminating agent.

U.S. Pat. No. 3,468,972 to Hsieh discloses reacting lithium terminated organic polymers with polyfunctional treating agents to produce a maximum of branching or coupling as the case may be. This reference does not disclose reacting a silylated organic polymer with a silane which is free of aliphatic unsaturation and has at least one functional group which is capable of reacting with the carbanion and thereby terminating the silylated organic polymer.

Therefore, it is an object of this invention to prepare silylated organic polymers. Another object of this invention is to provide silylated organic-organopolysiloxane block copolymers. Still another object of this invention is to provide a method for preparing carbanion free silylated organic polymers. A further object of this invention is to provide a method for preparing silylated organic-organopolysiloxane block copolymers.

SUMMARY OF THE INVENTION

These and other objects which will become apparent from the following description are accomplished in accordance with this invention, generally speaking, by reacting (A) carbanion terminated organic polymers with (B) silanes containing aliphatic unsaturation in the presence of an aprotic solvent to produce silylated organic polymers of the formula

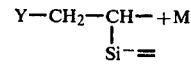

where M is an alkali metal cation, Y is the organic polymer and the unsatisfied valences of the silicon atoms are satisfied by a hydrocarbon radical or Y. These carbanion containing silylated organic polymers may be further reacted with other silanes containing aliphatic unsaturation or with unsaturated monomers capable of anionic polymerization to form carbanion containing copolymers of silylated organic polymers. The carbanion containing silylated organic polymers or silylated organic copolymers may be reacted with a compound which is capable of reacting with the carbanion to form a terminated silylated polymer or copolymers. Likewise, the carbanion containing silylated organic polymers or copolymers may be reacted with cyclic siloxanes to form silylated organic-organopolysiloxane block copolymers which contain alkali metal silanoate terminal groups. These silylated organic-organopolysiloxane block copolymers may then be reacted with a compound which is capable of reacting with the alkali metal silanoate to form a terminated silylated organic-organopolysiloxane block copolymer.

DETAILED DESCRIPTION OF THE INVENTION

More specifically, these polymers may be prepared by reacting a carbanion producing catalyst with unsaturated monomers in the presence of an aprotic solvent. Examples of suitable carbanion producing catalysts are alkali metals such as lithium, sodium, potassium, rubidium, cesium and organoalkali metal compounds such as lithium naphthalene, lithium anthracene, butyl lithium, vinyl lithium, lithium stilbene, biphenyl lithium, 1,4-dilithiobenzene, 1,5-dilithiopentane, 1,5-dilithionaphthalene, 1,2-dilithio-1,3,3-triphenylpropane, 1,3,5-trilithiopentane, sodium naphthalene, potassium naphthalene, rubidium naphthalene, cesium naphthalene, sodium anthracene, potassium anthracene, rubidium anthracene, cesium anthracene, sodium stilbene, potassium stilbene, rubidium stilbene, cesium stilbene, 9-fluorenyl sodium, 9-fluorenyl potassium, 9-fluoroenyl cesium, diphenyl sodium, diphenyl potassium, diphenyl rubidium, diphenyl cesium and the like.

The term "aprotic solvent" refers to any organic solvent which is free of active protons. These may include hydrocarbon solvents such as heptane, benzene, toluene and xylene and the like. It is preferred, but not necessary, that an aprotic solvent capable of coordinating with the alkali metal be employed. These include non-acid oxygen containing and nitrogen containing organic solvents such as tetrahydrofuran, tetrahydropyrane, diethoxyethane; alkyl ethers such as diethyl ether, dibutyl ether, methyl ethyl ether; higher boiling ethers such as monoalkylene glycol dialkyl ethers, dialkylene glycol monoalkyl ethers, dialkylene glycol dialkyl ethers and monoalkylene glycol monoalkyl ethers, dimethyl acetamide, N-methyl-pyrrolidine, isobutylene oxide, dimethyl sulfoxide, dioxane, diethyl ether of diethylene glycol, and various tertiary amines such as dimethyl aniline, tributylamine, pyridine and the like. For obvious reasons, solvents which contain an acid hydrogen should be avoided.

Any unsaturated monomer that may be polymerized by anionic polymerization techniques may be employed in this invention. Also, any polymerized substituted olefin having residual unsaturation is operative in this invention. Specific examples of suitable monomers are hydrocarbon olefins such as ethylene, butadiene, styrene, vinyl-toluene, divinylbenzene, isoprene, unsaturated esters such as the acrylates and alkyl substituted acrylates, e.g., methylacrylate, methylmethacrylate, ethylacrylate, butylacrylate, and unsaturated nitriles such as acrylonitrile, methacrylonitrile and the like.

The reaction between the carbanion forming catalyst and the unsaturated organic monomers may be conducted at any temperature below 150° C., preferably below about 100° C. and more preferably between 0° C. and 50° C.

The amount of carbanion forming catalyst employed in the polymerization may range from about 0.000001 to 0.8 mole per 100 grams of polymerizable monomers.

The alkali metal terminated organic polymers thus formed may be reacted with silicon compounds containing aliphatic unsaturation. These silicon compounds may be represented by the general formula $$X_{4-a-b}\overset{R_b}{\underset{|}{Si}}(CH=CH_2)_a$$

where R is a monovalent hydrocarbon radical, X is a member selected from the class consisting of halogen, hydrocarbonoxy radicals, acyloxy radicals, phosphato radicals, sulfato radicals, perchlorate radicals, or any other groups which are reactive with the alkali-metal carbanion, a is a number of from 1 to 3 and b is a number from 0 to 2 and the sum of a+b is from 1 to 3.

Suitable examples of radicals represented by X are halogens such as chlorine, fluorine, bromine and iodine; acyloxy radicals of the formula $$-\overset{O}{\underset{||}{O}}CR'$$

in which R' is hydrogen or an organic radical such as an alkyl or aryl radical having from 1 to 18 carbon atoms; hydrocarbonoxy radicals of the formula —OR" in which R" is an organic radical such as alkyl or aryl radicals of from 1 to 10 carbon atoms; phosphato radicals of the formula $$-\overset{O}{\underset{||}{O}}P-(OR')_2$$

in which R' is the same as above; sulfur containing radicals of the formula $SO_y$ where y is an integer of from 2 to 4 and chlorates of the formula —$ClO_4$.

Suitable examples of alkyl radicals represented by R are methyl, ethyl, propyl, butyl, pentyl, hexyl, octyl, decyl, octadecyl and the like; aryl radicals such as phenyl naphthyl, biphenyl and the like; alkaryl radicals such as tolyl, xylyl, ethylphenyl and the like; aralkyl radicals such as benzyl, phenylethyl and the like. The organic radicals represented by R' and R" may be the same as the alkyl and aryl radicals represented by R.

Examples of suitable silanes having aliphatic unsaturation which may be employed in the preparation of the silylated organic polymers are vinyltrichlorosilane, divinyldichlorosilane, divinyldiacetoxysilane, dimethoxymethylvinylsilane, methylvinyldiacetoxysilane, dimethylvinylbromosilane, phenylmethylvinylchlorosilane, dibutylvinylacetoxysilane and the like.

The reaction between the alkali metal terminated organic polymers and the silanes containing aliphatic unsaturation may be carried out in the presence or absence of a solvent. It is preferred that the reaction be conducted in the presence of aprotic solvents which are capable of coordinating with the alkali-metal cation. Surprisingly, it has been found that when such solvents are employed, the alkali-metal carbanion preferably reacts with the halogen or other reactive groups before it reacts with the C=C unsaturated group, thus permitting a greater degree of control of molecular weight and chain branching. The aprotic solvents employed may be the same as those described heretofore. Although the amount of solvent is not critical, it is preferred that from 1 to 95 percent by weight of solvent be present based on the weight of the alkali metal organic polymers and unsaturated silanes.

Generally, the reaction is carried out at a temperature of from about 0° to 150° C. and more preferably from about 10° to 50° C. Higher or lower temperatures may however be employed, if desired.

The preparation of the alkali metal terminated organic polymers may be illustrated by the following equations, although these are not intended to limit the scope of the invention.

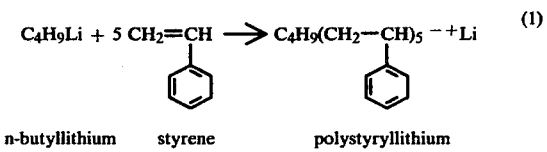  (1)

n-butyllithium    styrene    polystyryllithium

The reaction between the resulting organometallic hydrocarbon compound of equation (1) and the silane containing an unsaturation aliphatic group may be illustrated in the following manner.

When the polystyryllithium compound is reacted with, for example, vinyltrichlorosilane, a branched siliconhydrocarbon polymer is formed.

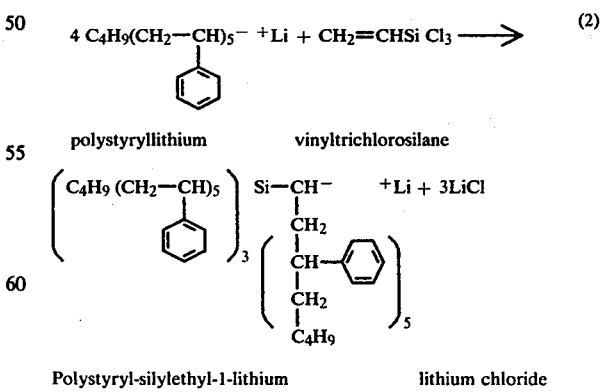  (2)

Polystyryl-silylethyl-1-lithium    lithium chloride

When the polystyryllithium compound is reacted with, for example, a trimethylvinylsilane, as illustrated below a linear silicon hydrocarbon polymer is formed.

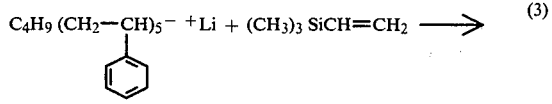

(3)

Polystyryllithium    Trimethylvinylsilane

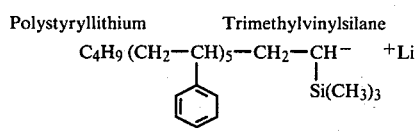

Polystyryl-silylethyl-1-lithium

In accordance with the invention the hydrocarbon-silylethyl-1-alkali-metal can be reacted with a cyclic organopolysiloxane to form block copolymers containing silicon-hydrocarbon segments and organopolysiloxane segments. Cyclic organopolysiloxanes which can be used in the method of this invention include those of the formula $(R_2SiO)_n$ in which n is at least 3 and may be up to 10 in which R is the same as above. The reaction is preferably carried out in the presence of an aprotic solvent and more preferably in the presence of an aprotic solvent which is capable of coordinating with the alkali metal cation. The same aprotic solvents as described above may be employed in this reaction. In carrying out the reaction, the reaction temperature is not critical and may range from 25° C. to about 200° C. and more preferably from about 25° C. to 150° C. However, higher or lower temperatures may be employed, if desired.

Suitable examples of cyclic organopolysiloxanes which may be employed in the reaction are hexamethylcyclotrisiloxane, 1,3,5-trimethyl-1,3,5-triphenylcyclotrisiloxane, octamethylcyclotetrasiloxane, octaphenylcyclotetrasiloxane, decamethylcyclopentasiloxane, pentamethylpentaphenylcyclopentasiloxane, hexadecamethylcyclooctasiloxane and the like.

The reaction between the alkali metal silylated hydrocarbon polymers and hexamethylcyclotrisiloxane ($D_3$) may be illustrated by the following equations.

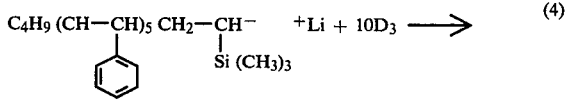

(4)

Linear Polystyryl-1-silylethyl-1-lithium    hexamethylcyclotrisiloxane

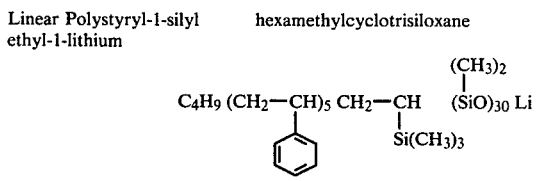

Linear Polystyryl-1-silylethyl-1-dimethyl polysiloxane block copolymer

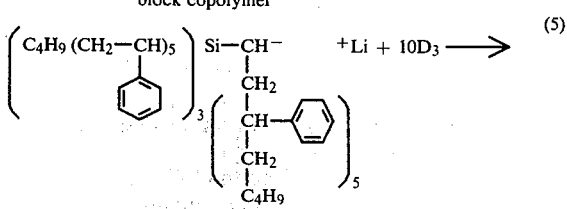

(5)

Branched polystyryl-silylethyl-1-lithium    Hexamethylcyclotrisiloxane

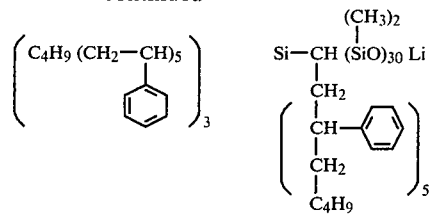

Branched polystyryl-silylethyl-1-dimethylpolysiloxane copolymer

The hydrocarbon-silylethyl-1-alkali metal can be further reacted with other monomers containing other olefinic unsaturation and/or other vinyl containing silanes to form silylated hydrocarbon polymers having multiple branched or linear chains of repeating units. The resulting silylated hydrocarbon polymers described above can then be reacted with cyclic organopolysiloxanes such as described above to form silylated hydrocarbon organopolysiloxane block copolymers in which the silylated hydrocarbon polymers contain multiple branched or linear chains. The following equations illustrate the general reactions, but are not intended to limit the scope of this invention.

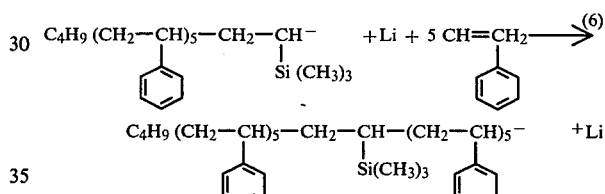

Product from Equation 6 + $10D_3$ → (7)

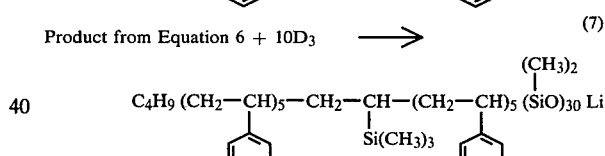

Product from Equation 6 + $(CH_3)_3$ Si CH=$CH_2$ → (8)

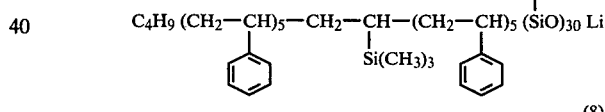

Product from Equation 8 + $10D_3$ → (9)

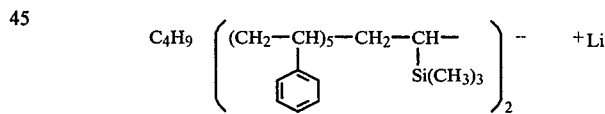

The silylated organic polymers and the copolymers consisting of silylated organic polymers and organopolysiloxanes which contain the metal carbanion or metal silanoate, respectively, may be reacted with various compounds having groups capable of reacting with the carbanion or silanoate to remove the reactive sites on the polymers. Examples of suitable compounds are water; carboxylic acids such as acetic acid, oxalic acid, formic acid, maleic acid and the like; carboxylic acid anhydrides such as acetic anhydride, phthalic anhydride, maleic anhydride and the like; inorganic acids such as hydrochloric, hydroiodic, hydrofluoric, hydrobromic, sulfuric, nitric, perchloric and the like; alcohols such as methanol, ethanol, isopropanol, 1-butanol and the like; silanes which are free of aliphatic unsaturation and have at least one group selected from the class consisting of halogen, acyloxy, phosphato, sulfato, hydrocarbonoxy and perchlorato radicals. Examples of suitable silanes are trimethylchlorosilane, dimethyldichlorosilane, methyltrichlorosilane, silicon tetrachloride, trimethylacetoxysilane, dimethyl disulfato silane, methyltrimethoxysilane, methyltris(diethylphosphato)silane and the like.

These compounds may be reacted with the silylated polymers or copolymer of silylated organic polymers and organic-organopolysiloxanes at any temperature, ranging from room temperature up to about 150° C. and more preferably from about 35° C. to about 115° C.

The compound having a reactive group capable of reacting with the carbanion or silanoate and thus terminate the polymers is preferably employed in a mole ratio of reactive group to carbanion or silanoate of 1:1.

For example, when the compound contains one reactive group, then the mole ratio of compound to carbanion or silanoate is preferably 1:1. However, when the compound contains, for example two reactive groups, then the mole ratio of compound to carbanion or silanoate is 0.5:1. Thus, the mole ratio of reactive groups to carbanion or silanoate is preferably 1:1, although higher or lower concentrations may be employed, if desired.

If desired, the silylated organic polymers or silylated block copolymers may be separated from the resultant product by any technique known in the art, such as for example, filtration, centrifugation, decantation and the like.

The silylated organic polymers and silylated organic organopolysiloxane copolymers may be vulcanized by the conventional techniques known in the art. For example, when polydiene units are present, vulcanization is possible with sulfur as well as with other chemicals which have been used for curing natural rubber. Other vulcanization agents which may be used in place of sulfur are disulfides, alkyl phenol sulfides, p-dinitrosobenzene, sulfur dichloride, tetramethyl thiuram disulfide, tetraethyl thuran disulfide, etc. Any conventional process known to the art may be employed in the vulcanization of the above polymers such as by milling and heating in the presence of vulcanizing agents.

The silylated organic polymers and silylated organic-organopolysiloxane block copolymers obtained from vinyl monomers can be cured using the conventional curing agents employed in heat curable organopolysiloxane compositions. Examples of suitable curing agents are organic peroxides such as dicumyl peroxide, benzoyl peroxide, bis(2,4-dichlorobenzoyl) peroxide, tertiary butyl perbenzoate, high energy radiation and the like.

Moreover, these polymers may be combined with various silane or siloxane cross-linking agents known in the art to form room temperature or heat vulcanizable compositions. Examples of suitable cross-linking agents are silanes and siloxanes containing acyloxy groups having up to 10 carbon atoms such as methyltriacetoxysilane, tetraacetoxysilane and the like; silanes and siloxanes containing aryloxy or alkoxy groups such as tetraethylorthosilicate, ethyl silicate "40;" silanes containing amino groups such as methyltricyclohexyl aminosilane, hydrogen containing silanes such as methylhydrogenpolysiloxanes and the like. Other cross-linking agents which may be employed are silanes or siloxanes containing other groups which are hydrolyzable at room temperature such as oximo groups, aminooxygroups, amides and phosphato groups. Compounds such as titanates, tin salts or carboxylic acids and platinum compounds may be employed as catalysts to accelerate the curing of these compositions. Also, temperatures of from 25° to 200° C. may be used to accelerate curing.

These polymers and copolymers may be compounded with various additives, depending on the particular properties desired, before they are cured. Suitable examples of these additives are stabilizers, plasticizers, fillers and the like.

The block copolymers obtained herein, especially in the cured state can be employed in the manufacture of high temperature sealants, e.g., as gaskets, rings, tubing, fuel lines, insulation, motor mountings and the like.

The embodiments of this invention are further illustrated by the following examples in which all parts are by weight unless otherwise specified.

EXAMPLE 1

Approximately 6 parts of a 1.5 molar solution of n-butyl lithium (0.01 mole) in heptane and 15 parts of tetrahydrofuran are added to a round bottom flask equipped with a stirrer. A nitrogen atmosphere is maintained in the flask. The mixture is cooled to 0° C. and 9.6 parts of tertiary-butyl styrene are added dropwise. The reaction mixture is stirred 0.5 hour at room temperature and then the reaction mixture is cooled to 0° C. About 0.46 part of methylvinyldichlorosilane is added dropwise to the reaction mixture. The temperature is maintained at 0° to 10° C. throughout the addition. The reaction mixture is stirred 1 hour at room temperature, then 0.06 part of acetic acid is added and the lithium acetate precipitate thus formed is removed by filtration. The silylated hydrocarbon polymer is isolated from the solvent by vacuum stripping. Analysis of the product indicates that it has the following structure.

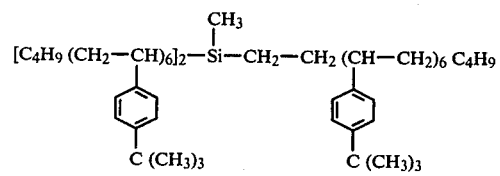

The molecular weight of the product is about 2900. The theoretical value calculated is about 3148. This illustrates the silylated hydrocarbon polymers may be prepared having a predetermined amount of branching and a predetermined molecular weight.

EXAMPLE 2

The procedure of Example 1 is repeated except that 9-fluorenyl sodium is substituted in the same mole ratio for the n-butyl lithium. Essentially the same results are obtained.

EXAMPLE 3

About 109.8 parts of a 1.5 molar solution of n-butyl lithium (1.18 moles) in heptane and 75 parts of tetrahydrofuran are added to a round bottom flask equipped with a stirrer. A nitrogen atmosphere is maintained in the flask. The mixture is cooled to 0° C. and 76.2 parts of styrene are added over a twenty minute period. The temperature throughout the addition is maintained at 0° to 10° C. The reaction mixture is stirred one hour at room temperature, then 8.6 parts of methylvinyldichlorosilane is added over a one minute period and the resulting reaction mixture is stirred for an additional hour at room temperature. The resulting silylated hydrocarbon polymer may be represented by the formula

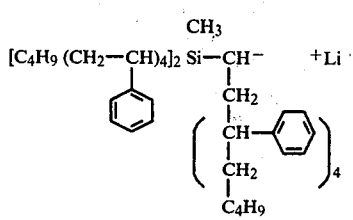

About 108.3 parts of hexamethylcyclotrisiloxane and 110 parts of benzene are added to the reaction mixutre. The mixture is refluxed for about 4.5 hours, then about 1.18 moles of trimethylchlorosilane are added and the lithium chloride precipitate thus formed is removed by filtration. The silylated polystyryl-dimethylpolysiloxane copolymer is isolated by vacuum stripping. A grease-like composition is obtained which may be represented by the general formula

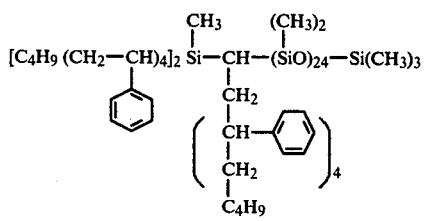

Nuclear Magnetic Resonance analysis confirms the ratio of siloxane to polystyrene of 1:0.48. Molecular weight analysis indicates a molecular weight of about 3390. The theoretical value calculated for this product is approximately 3262. This example demonstrates that silylated hydrocarbonorganopolysiloxane copolymers may be prepared having a predetermined number of silylated hydrocarbon units and organopolysiloxane units.

EXAMPLE 4

The procedure of Example 3 is repeated except that 1.18 moles of water are substituted for the trimethylchlorosilane.

EXAMPLE 5

The procedure of Example 3 is repeated except that 1.18 moles of methanol are substituted for the trimethylchlorosilane.

EXAMPLE 6

The procedure of Example 3 is repeated except that dilute hydrochloric acid containing 1.18 moles of hydrochloric acid are substituted for the trimethylchlorosilane.

EXAMPLE 7

The procedure of Example 3 is repeated except that an equal molar amount of 9-fluorenyl potassium is substituted for the n-butyl lithium. A silylated polystyrene-dimethylpolysiloxane copolymer having a lower molecular weight than the copolymer prepared in Example 3 is obtained.

EXAMPLE 8

The procedure of Example 3 is repeated except that 49.6 parts of isoprene are substituted for the styrene. A silylated polyisoprene-organopolysiloxane copolymer is identified.

EXAMPLE 9

The procedure of Example 7 is repeated except that 108.3 parts of octamethylcyclotetrasiloxane are substituted for the hexamethylcyclotrisiloxane. Substantially the same results are obtained as in Example 7. This example shows that any cyclic organopolysiloxane may be used in the preparation of the copolymers of this invention.

EXAMPLE 10

The product obtained from Example 4 (100 parts) is mixed with 5 parts of methyltriacetoxysilane in a nitrogen atmosphere and then exposed to atmospheric moisture. After about twenty hours, an insoluble rubber-like material is obtained.

Although specific examples of the invention have been described herein, it is not intended to limit the invention solely thereto, but to include all the variations and modifications falling within the spirit and scope of the appended claims.

What is claimed is:

1. A method for preparing a terminated silylated copolymer which comprises (1) forming a carbanion containing organic polymer by polymerizing a monomer having carbon-to-carbon double bonds in the presence of a carbanion forming catalyst, (2) reacting the carbanion containing organic polymer with a vinyl containing silane having at least one group selected from halogen, acyloxy radicals and perchlorato radicals to form a silylated copolymer and thereafter (3) reacting the silylated copolymer containing a carbanion with a compound which will react with the carbanion to form a terminated silylated copolymer, said compound is selected from the group consisting of water, carboxylic acids, carboxylic acid anhydrides, inorganic acids, alcohols and silanes which are free of aliphatic unsaturation and have at least one group selected from the class consisting of halogen, acyloxy, phosphato, sulfato, hydrocarbonoxy and perchlorato radicals.

2. The process of claim 1, wherein the compound is a silane free of aliphatic unsaturation and having at least one group selected from the group consisting of halogen, acyloxy, phosphato, sulfato, hydrocarbonoxy and perchlorato radicals.

3. The method of claim 1, wherein the silylated copolymer is reacted with a cyclic siloxane to form a silylated organic organopolysiloxane containing an alkali metal silanoate terminal group and thereafter reacting the silylated organic-organopolysiloxane containing an alkali metal silanoate terminal group with a compound which will react with the alkali metal silanoate to form a terminated organic-organopolysiloxane, said compound is selected from the group consisting of water, carboxylic acids, carboxlyic acid anhydrides, inorganic acids, alcohols and silanes which are free of aliphatic unsaturation and have at least one group selected from the class consisting of halogen, acyloxy, phosphato, sulfato, hydrocarbonoxy and perchlorato radicals.

4. The process of claim 1, wherein the compound is water.

5. The process of claim 1, wherein the compound is a carboxylic acid.

6. The process of claim 1, wherein the compound is a carboxylic acid anhydride.

7. The process of claim 1, wherein the compound is an inorganic acid.

8. The process of claim 1, wherein the compound is an alcohol.

9. A terminated silylated copolymer which is obtained from the reaction of a compound selected from the group consisting of water, carboxylic acids, carboxylic acid anhydrides, inorganic acids, alcohols and silanes which are free of aliphatic unsaturation and have at least one group selected from the class consisting of halogen, acyloxy radicals, phosphato radicals, sulfato radicals, hydrocarbonoxy radicals and perchlorato radicals with a carbanion containing silylated organic polymer said carbanion containing silylated organic polymer was obtained from the reaction of a vinyl containing silane having at least one group selected from halogen, acyloxy radicals, phosphato radicals, sulfato radicals, hydrocarbonoxy radicals and perchlorato radicals with a carbanion containing organic polymer, said carbanion containing organic polymer was obtained from the anionic polymerization of an organic monomer having carbon-to-carbon double bonds in the presence of a carbanion forming catalyst.

10. A terminated silylated organic-organopolysiloxane which is obtained from the reaction of a compound selected from the group consisting of water, carboxylic acids, carboxylic acid anhydrides, inorganic acids, alcohols and silanes which are free of aliphatic unsaturation and have at least one group selected from the class consisting of halogen, acyloxy radicals, phosphato radicals, sulfato radicals, hydrocarbonoxy radicals and perchlorato radicals with a silylated organic-organopolysiloxane containing an alkali metal silanoate, said silylated organic-organopolysiloxane was obtained from the reaction of a cyclic organopolysiloxane with a carbanion containing silylated organic polymer, said carbanion containing silylated organic polymer was obtained from the reaction of a vinyl containing silane having at least one group selected from halogen, acyloxy radicals, phosphato radicals, sulfato radicals, hydrocarbonoxy radicals and perchlorato radicals with a carbanion containing organic polymer, said carbanion containing organic polymer was obtained from the anionic polymerization of an organic monomer having carbon-to-carbon double bonds in the presence of a carbanion forming catalyst.

* * * * *